United States Patent
Urnes, Sr. et al.

(10) Patent No.: US 6,622,972 B2
(45) Date of Patent: Sep. 23, 2003

(54) METHOD AND SYSTEM FOR IN-FLIGHT FAULT MONITORING OF FLIGHT CONTROL ACTUATORS

(75) Inventors: James M. Urnes, Sr., Bridgeton, MO (US); Mark B. Hood, St. Charles, MO (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/002,591

(22) Filed: Oct. 31, 2001

(65) Prior Publication Data

US 2003/0080256 A1 May 1, 2003

(51) Int. Cl.[7] ................................................ G05D 3/12
(52) U.S. Cl. ...................................... 244/194; 244/195
(58) Field of Search ............................... 244/194, 75 R, 244/76 R, 181, 195, 904, 76 C, 17.13; 73/862.13, 862.16, 862.18, 147; 93/167

(56) References Cited

U.S. PATENT DOCUMENTS

| | | | | |
|---|---|---|---|---|
| 2,344,945 A | * | 3/1944 | Knox et al. ................ 244/217 |
| 4,071,209 A | * | 1/1978 | Hart ........................... 244/223 |
| 4,146,200 A | * | 3/1979 | Borzachillo ............... 244/75 R |
| 4,595,158 A | | 6/1986 | Robinson .................... 244/75 |
| 4,626,996 A | * | 12/1986 | Arlott ......................... 701/14 |
| 4,649,484 A | * | 3/1987 | Herzog et al. ................ 701/3 |
| 5,023,791 A | | 6/1991 | Herzberg et al. ...... 364/424.04 |
| 5,274,554 A | * | 12/1993 | Takats et al. ................ 701/33 |
| 5,615,119 A | * | 3/1997 | Vos ............................... 701/4 |
| 5,819,188 A | * | 10/1998 | Vos ............................... 701/4 |
| 5,881,971 A | | 3/1999 | Hickman ..................... 244/75 |
| 5,963,545 A | | 10/1999 | Shibasaki ................. 370/242 |
| 6,085,127 A | * | 7/2000 | Vos ............................... 701/4 |
| 6,389,335 B1 | * | 5/2002 | Vos ............................... 701/4 |

OTHER PUBLICATIONS

Hal Gurgenci; *Undergraduate Thesis Topics*; © 2000; pp. 1–6.

NASA; *NASA IVHM Technology Experiment for X–37*; Feb. 9, 2001; pp. 1–3.

\* cited by examiner

*Primary Examiner*—Charles T. Jordan
*Assistant Examiner*—Stephen A Holzen
(74) *Attorney, Agent, or Firm*—Black Lowe & Graham PLLC

(57) ABSTRACT

A method and system for detecting in-flight fault characteristics of flight control actuators is provided. Commands are sequentially sent to sets of actuators during flight in a manner that is expected to produce little or no net aircraft motion. The detection of motion indicates the possibility of a faulty actuator. If additional tests confirm the failure, the actuator is isolated and other actuators are compensated to adjust for the failed actuator, permitting continuation of safe and controllable fight by the flight crew and control for a safe landing. This isolation of the suspect failed actuator serves to prevent a possible upset of the aircraft control should the suspect actuator completely fail to a large offset condition, due to continued use during flight, a situation that may cause loss of control of the aircraft.

20 Claims, 3 Drawing Sheets

METHOD AND SYSTEM FOR IN-FLIGHT FAULT MONITORING OF FLIGHT CONTROL ACTUATORS

GOVERNMENT LICENSE RIGHTS

This invention was made with Government support under U.S. Government contract N000421-00-3-0123 awarded by the U.S. Navy. The Government has certain rights in this invention.

FIELD OF THE INVENTION

This invention relates generally to fault detection of flight control actuators and, more specifically, to a method and system for monitoring and testing in-flight fault characteristics of flight control actuators without producing adverse in-flight motion.

BACKGROUND OF THE INVENTION

Aircraft actuators are integral components for the maintenance of proper operational flight control. The actuators control moveable flight surfaces such as ailerons, flaps, leading-edge slats, spoilers, horizontal stabilizer, elevators, and rudders. Without accurate and timely fault detection and diagnostics of the actuators, catastrophic results may occur. Correctly repairing a damaged actuator depends on such accuracy and timeliness.

Although actuator fault detection is crucial, it remains problematic because in most cases actuators must be tested post-flight, on the ground. The data collected in post-flight diagnostics is not as reliable as in-flight diagnostics in that it does not allow for operating flight loads on the actuation system, leading to incorrect diagnostics and costly replacement of the wrong actuator or actuator component. The problem is more acute for Uninhabited Air Vehicles where a flight crew is not present to deal with the failure situation and the failure could cause the loss of the vehicle.

SUMMARY OF THE INVENTION

This invention comprises a method and system for monitoring in-flight fault characteristics of flight control actuators. The system includes an electronic flight control system in communication with a fault detection system. The electronic flight control system includes a flight computer configured to send command signals to at least one actuator in response to flight commands. The electronic flight control system further includes a plurality of aircraft response sensors that measure aircraft attitude such as pitch, roll, yaw, or other aspects.

The electronic flight control system sends command signals to the actuators to affect a flight surface associated with each actuator. As the electronic flight control system issues each command, the computer processors associated with the electronic flight control system compute the appropriate signal command and further send the command signal to the, affected actuator. The actuator responds by adjusting, if necessary, the affected flight surface.

The flight surfaces include ailerons, flaps, leading-edge slats, spoilers, horizontal stabilizer, elevators, and rudders or any other flight surface capable of affecting the aerodynamics of an aircraft.

The fault detection system includes a computer processor configured to perform inflight operations on monitored aircraft data. The fault detection system computes and sends its own signals to at least one actuator through the electronic flight control system. If the actuators are functioning properly, the actuators will move in a canceling manner, with no net motion to the aircraft. However, when a response sensor detects an unexpected aircraft motion it is indicative of a possible actuator failure.

In accordance with other aspects of the invention that detects a possible actuator failure, the various aircraft actuators are tested sequentially, one or more at a time, cycling through the aircraft until all actuators have been tested.

In accordance with further aspects of the invention, upon identifying a potentially failed actuator, an additional test is performed to verify the failure. Preset test commands are sent to one or more suspect actuators and surface position data, as well as aircraft motion sensors, are monitored. During these tests, the fault detection system sends signals to reset the remaining aircraft flight surfaces to compensate for the preset test commands on the suspect actuator. This compensation is achieved by activating a reconfigurable control mode that reconfigures other actuators so that the test commands cause no perceptible aircraft motion beyond those commanded by the pilot (or autopilot). This subsequent confirmation test allows confirmation that the suspected actuator has actually failed, without disrupting the mission capability of the vehicle.

In accordance with still other aspects of the invention, the fault detection system isolates and removes the failed actuator from the rest of the electronic flight control system. Further, the fault detection system sends command signals to reset the remaining aircraft flight surfaces to compensate for the removed actuator by activating a reconfigurable control mode that reconfigures other actuators to maintain safe and controllable handling qualities for the aircraft.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
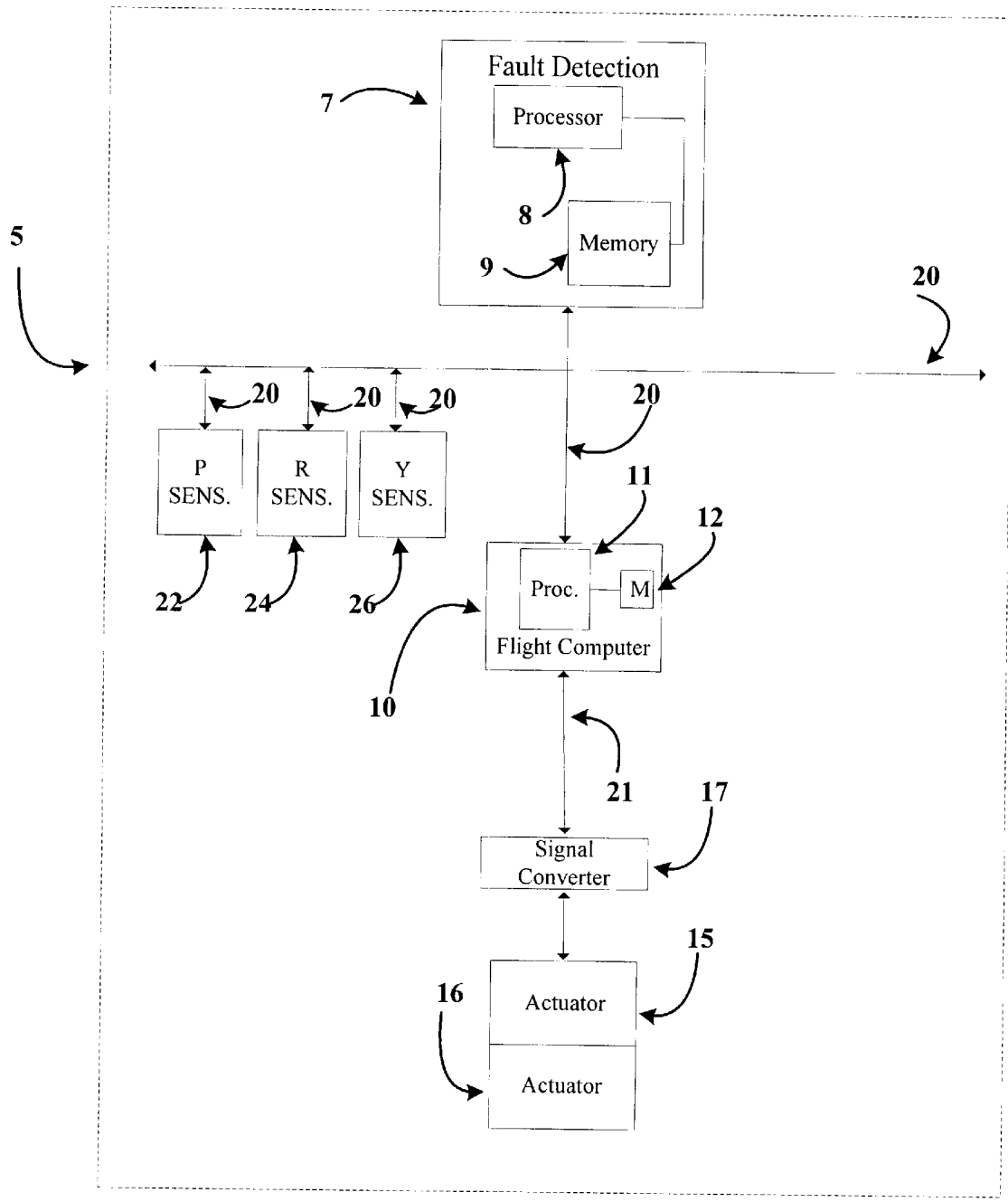
FIG. 1 is a schematic block diagram showing an electronic flight control system in communication with a fault detection system according to the invention.

FIG. 1 is a schematic block diagram showing an electronic flight control system of an aircraft in communication with a fault detection system. An electronic flight control system 5 includes a fault detection system 7 connected via a communication bus 20 to at least one flight computer 10. The flight computer 10 includes a computer processor 11 and associated memory 12, and is in communication with one or more actuators 15, 16 via a hardwire analog interface 21. A signal converter 17 is included as an interface between the flight computer 10 and the actuators 15, 16 to convert digital signals to analog signals and vice versa, as appropriate.

The flight surfaces (not shown) controlled by the actuators 15, 16 include the ailerons, flaps, leading-edge slats, spoilers, horizontal stabilizer, elevators, and rudders or any other flight surface capable of affecting the aerodynamics of an aircraft. Although two actuators are shown, an aircraft may have any number of actuators, consistent with this invention.

The electronic flight control system 5 further includes aircraft attitude response sensors including a pitch sensor 22, roll sensor 24, and yaw sensor 26. The pitch sensor 22, roll sensor 24, yaw sensor 26, and surface position data sensors (not shown) associated with the actuators 15, 16 are connected to the electronic flight control system 5 via the communication bus 20. While the sensors of the preferred embodiment include those described above, other sensors such as load sensors, strain sensors, acceleration sensors, or others may be used.

Aircraft motion command signals are produced in response to inputs generated by the pilot (or other sources) and are sent via the communications bus 20 to the flight computer 10. The flight computer 10 sends the command signal to one or more of the affected actuators 15, 16 as a digital signal via a hardwire analog interface 21. The digital signal is converted to an analog signal by the signal conversion electronics 17 which have the capability to convert analog-to-digital signals and digital-to-analog signals. The command signal affects the flight surface associated with the actuators 15, 16. The actuators 15, 16 are electronically configured to receive the commands and respond by moving its associated flight surface. The flight computer 10 is capable of sending command signals to actuators 15, 16 individually, sequentially or simultaneously.

The fault detection system 7 includes at least one computer processor 8 and an associated memory 9. Although the fault detection system 7 is illustrated in FIG. 1 as a separate hardware component having a processor and memory, it could be implemented completely as software, consistent with the present invention. For example, computer instructions could be stored in the flight computer memory and processed by one or more processors already contained in the flight computer. The flight computer would then automatically, or on command, periodically issue fault detection commands in addition to flight control commands in the manner discussed in more detail below. Thus, references to the fault detection system are intended to mean either a separate hardware component or a computer program operating within existing flight hardware.

As described more fully below, the fault detection system 7 monitors the command signals of the electronic flight control system 5 to monitor unexpected actuator behavior and, if necessary, issues commands to reconfigure one or more actuators 15, 16 to maintain normal flight conditions.

Figure 2:
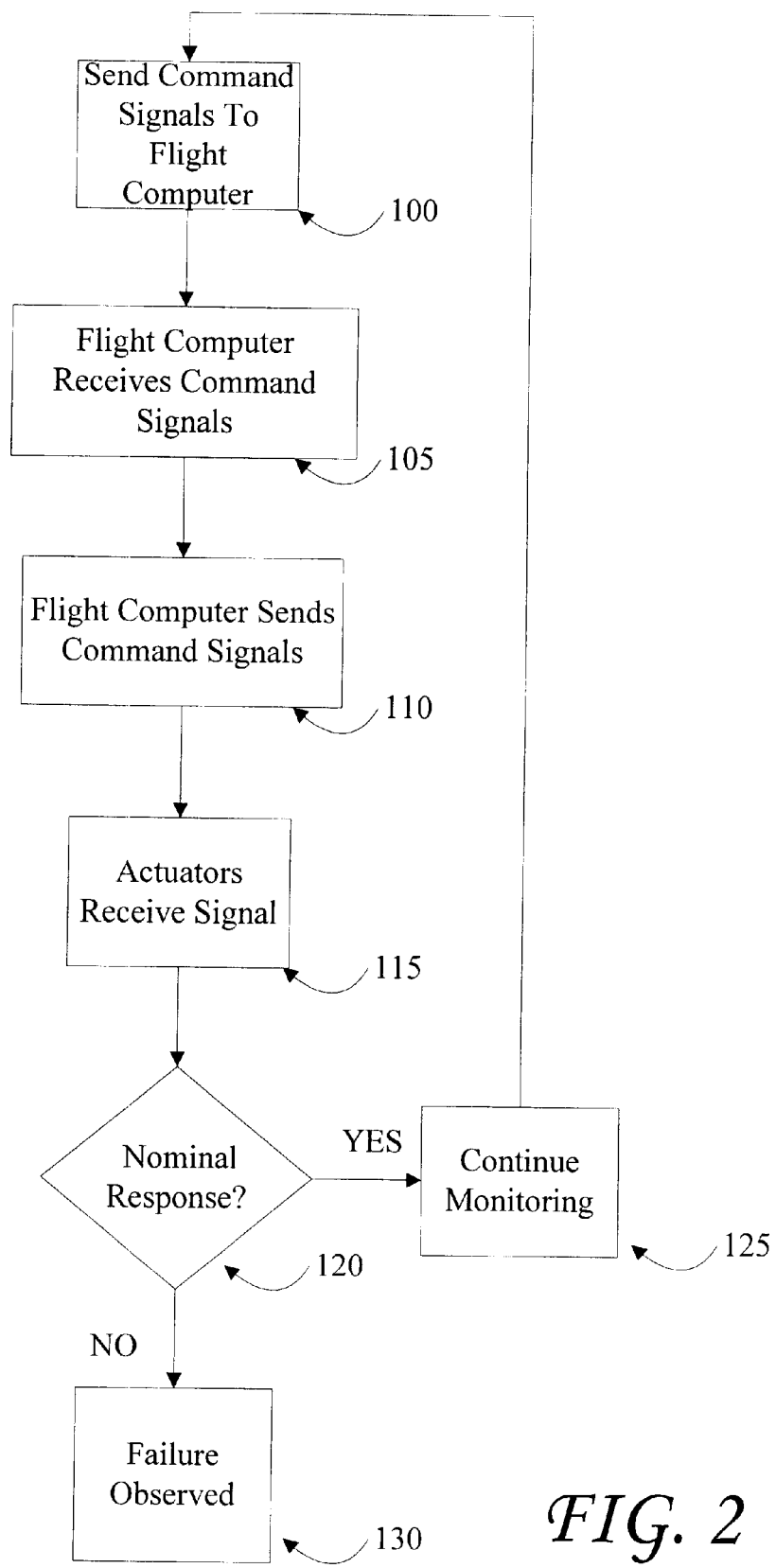
FIG. 2 is flow chart depicting the fault monitoring of one actuator of the invention.

FIG. 2 is flow chart depicting the fault monitoring of the electronic flight control system of the invention. At block 100, the fault detection system 7 simultaneously sends to the flight computer 10 at least one command signal to each actuator 15, 16 associated with a flight surface. The command signal sent to a first actuator 15 is an opposing command signal sent to a second actuator 16. For example, the first and second actuators 15, 16, may correspond to the left and right horizontal stabilizers. Other control surfaces are available for use in canceling the effects of aircraft motion due to the actuator undergoing the test. For example, the rudder and two ailerons may be used in addition to the paired horizontal stabilizer to compensate for the test on the suspect bad horizontal stabilizer.

The two command signals sent at block 100 are of such a magnitude and duration that they are expected to cancel one another so that no net aircraft motion results. If an aircraft motion is expected from the test signals, it is preferably imperceptible by persons within the aircraft even though such motion may be technically measurable. The actuator signals required to produce the test, termed the "null space" commands, are obtained or derived from software code stored in the memory 9 associated with the computer processor 8 of the fault detection system 7 as shown in FIG. 1. The code includes a plurality of aerodynamic control coefficients ($M_bStbL$, $M_aStbR$, etc.) to facilitate calculation of the required null space commands.

At block 105, the flight computer receives the command signals from the fault detection system. In the event the fault detection system is implemented within the flight computer as software, rather than hardware, this separate step would likely be unnecessary. The flight computer, in turn, sends both command signals to the targeted actuators 15, 16 via the hardwire analog interface 21.

At block 110, the flight computer 10 sends the command signals to the signal converter 17 to be converted and sent to their intended actuators 15, 16.

At block 115, each actuator 15, 16 receives the command signals sent by the flight computer 10 and moves the associated flight surface according to the command signal computed at block 100.

At block 120, the fault detection system 7 evaluates the actual aircraft response to the fault detection command signals. The actuator's 15, 16 actual response is obtained by accessing one or more sensors such as the pitch sensor 22, roll sensor 24, yaw sensor 26, and surface position data from the actuators 15, 16. The motion of the aircraft as determined from such sensors is compared to the expected motion of the aircraft based on all commands sent to the actuators, including any flight commands and fault detection commands.

If the aircraft behaved as expected as analyzed at block 120, the method proceeds to block 125 to continue monitoring. As with the initiation of fault detection monitoring in the first instance, continued monitoring is triggered in any of several ways, including continual background commanding, testing at programmed times, or upon initiation by a flight crew member.

If the aircraft did not perform as expected when analyzed at block 120, the method proceeds to block 130, where a possible actuator failure is noted. While the existence of a failed actuator is undesirable, it is also best to ensure that an actuator has actually failed before isolating it or shutting it down. Consequently, in the preferred embodiment of this invention an additional test is performed on the suspect actuator to confirm that it has actually failed. As with the initial fault detection method described above, the confirming test involves sending actuator commands that are expected to cancel and produce little or no aircraft motion if the actuators are all operating normally. The principal difference is that instead of sequencing through all aircraft actuators the confirming test only sends signals to the suspect actuator and one or more additional actuators such that no net motion is expected.

Figure 3:
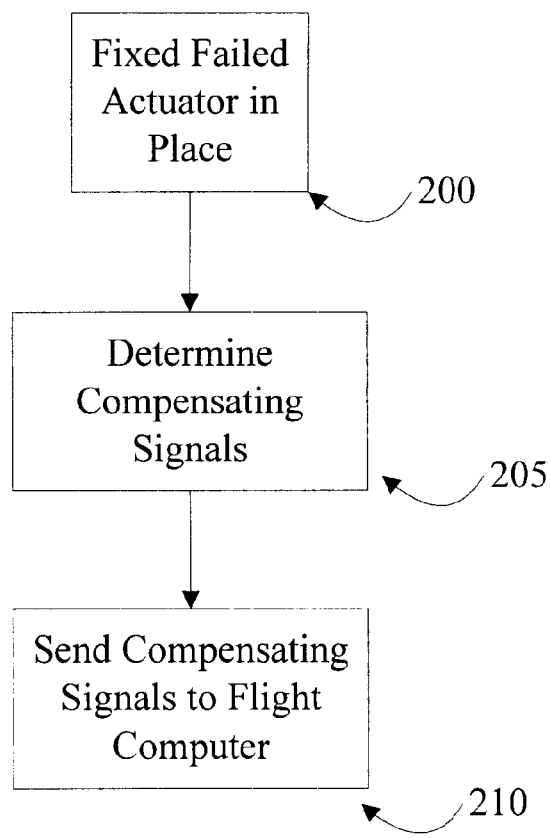
FIG. 3 is flow chart depicting the reconfiguration control mode of flight control actuators.

Once the fault detection system has confirmed that an actuator has failed, it reconfigures the flight control system to account for it, as illustrated in FIG. 3. At block 200 the fault detection system sends command signals to the suspected failed actuator fixing it in position, or possibly modifying its use level in operation of the control system. At block 205 the fault detection system determines, based on software code stored in its associated memory, the incremental command signals to send to at least one other actuator to allow that actuator to move its associated flight surface in a manner that compensates for the motion or lack of motion of the suspected failed actuator.

At block 210, the command signals are sent to at least one flight computer 10. The flight computer, in turn, sends the command signals to the one or more operational actuators to control the aircraft flight.

The above compensating method presumes that the fault detection system and flight control system are implemented using separate hardware, as shown in FIG. 1. In embodiments in which they are implemented using shared processors and memory, the above method is simplified in that compensating signals would not need to be sent from the fault detection system to a separate flight computer. Instead, the compensating signals may be determined by a shared processor and stored in a common memory.

While in the preferred embodiment the method for determining, verifying, and correcting for failed actuators is implemented automatically on a periodic basis during flight, a pilot or flight engineer can also override or turn off the fault detection system if desired. This alternative embodiment would be used when for example; a tactical high g maneuver or ground collision avoidance maneuver is necessary. Likewise, instead of running automatically on a continuous or continual basis during flight, the fault detection can alternatively be operated only upon command by flight personnel. In such cases, the system is operated either on a periodic basis or when flight personnel believe that the aircraft is not performing as expected.

An advantage of this invention is that much more accurate tests can be performed in the presence of actual operating conditions such as aerodynamic loads acting on the flight surfaces, flight temperatures, vibration, and others.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for monitoring in-flight fault characteristics of aircraft flight control actuators, the method comprising:
    commanding a first actuator via a first command signal;
    commanding a second actuator via a second command signal contemporaneously with the first command signal, wherein the first command signal and the second command signal are configured such that in combination they are expected to produce substantially no motion of the aircraft; and
    monitoring the aircraft for unexpected motion.

2. The method of claim 1, wherein the steps of commanding the actuators is performed contemporaneously with pilot commands such that no aircraft motion is expected beyond that produced by the pilot commands.

3. The method of claim 1, wherein additional pluralities of actuators are commanded in a sequential pattern.

4. The method of claim 1, further comprising determining, as a function of the unexpected motion, a suspected faulty actuator.

5. The method of claim 4, further comprising sending to the suspected faulty actuator further commands to confirm the suspected failure.

6. The method of claim 5, wherein the suspected faulty actuator is isolated so that the suspected faulty actuator does not receive further commands.

7. The method of claim 6, further comprising sending a compensating flight command to at least one actuator other than the isolated actuator to adjust for the isolated actuator.

8. A system for in-flight fault detection of flight control actuators, the system comprising:
    a plurality of aircraft flight control surfaces;
    at least one actuator in communication with each of the aircraft flight control surfaces;
    a computer processor in communication with the actuators; and
    a memory associated with the computer processor and containing stored programming instructions that, when operated by the computer processor, cause the processor to:
        command a first actuator via a first command signal;
        command a second actuator via a second command signal contemporaneously with the first command signal, wherein the first command signal and the second command signal are configured such that in combination they are expected to produce substantially no motion of the aircraft; and
        monitor the aircraft for unexpected motion.

9. The system of claim 8, wherein the command to the actuators is performed contemporaneously with pilot commands such that no aircraft motion is expected beyond that produced by the pilot commands.

10. The system of claim 8, wherein the stored programming instructions cause additional subsets of actuators to be commanded in a sequential pattern.

11. The system of claim 8, wherein the stored programming instructions further cause the processor to determine, as a function of the unexpected motion, a suspected faulty actuator.

12. The system of claim 11, wherein the stored programming instructions further cause the processor to send confirming commands to the suspected faulty actuator.

13. The system of claim 12, wherein the stored programming instructions further cause the processor to send commands to isolate the suspected faulty actuator.

14. The method of claim 13, wherein the stored programming instructions further cause the processor to adjust flight commands to at least one actuator to compensate for the isolated faulty actuator.

15. A system for in-flight fault detection of flight control actuators, the system comprising:
    a plurality aircraft flight control surfaces;
    at least one actuator in communication with each of the aircraft flight control surfaces;
    a means for commanding a first actuator via a first command signal and commanding a second actuator via a second command signal contemporaneously with the first command signal, wherein the first command signal and the second command signal are configured such that in combination they are expected to produce substantially no motion of the aircraft; and
    a means for monitoring the aircraft for unexpected motion.

16. The system of claim 15, wherein the means for commanding further comprises a means for commanding additional subsets of actuators in a sequential pattern.

17. The system of claim 15, further comprising a means for determining, as a function of the unexpected motion, a suspected faulty actuator.

18. The system of claim 17, further comprising a means for sending confirming commands to the suspected faulty actuator.

19. The system of claim 18, further comprising a means for isolating the suspected faulty actuator.

20. The system of claim 19, further comprising a means for adjusting flight commands to at least one actuator to compensate for the isolated faulty actuator.

* * * * *